UNITED STATES PATENT OFFICE.

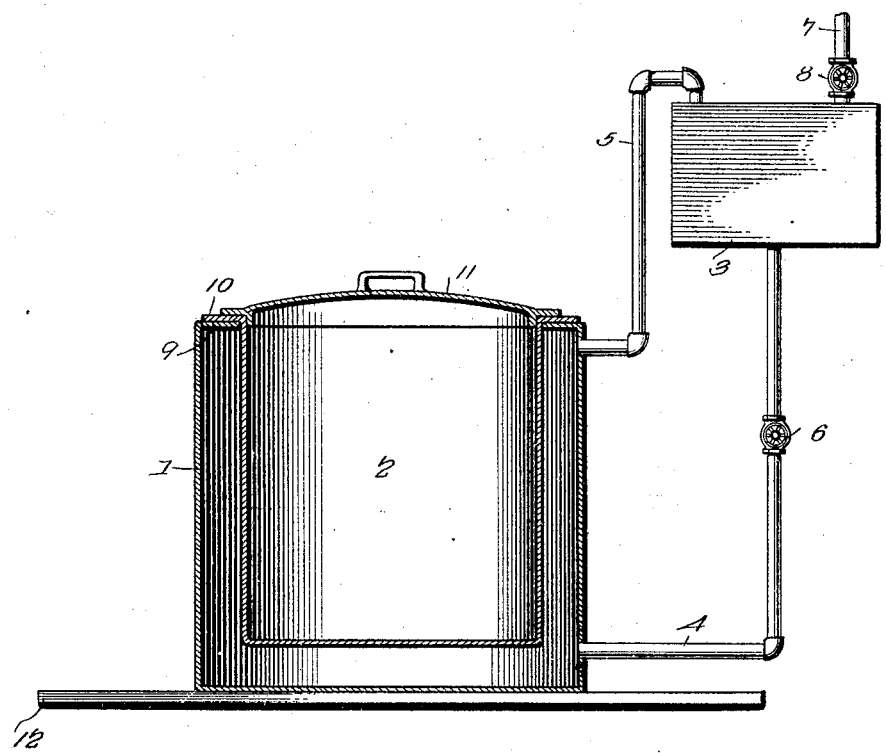

ALBERT P. GAINES, OF FAYETTEVILLE, ARKANSAS.

PROCESS OF PRESERVING FRUIT.

SPECIFICATION forming part of Letters Patent No. 683,112, dated September 24, 1901.

Application filed May 4, 1900. Serial No. 15,525. (No specimens.)

*To all whom it may concern:*

Be it known that I, ALBERT P. GAINES, a citizen of the United States, residing at Fayetteville, in the county of Washington and State of Arkansas, have invented a new and useful Process of Preserving Fruit, of which the following is a specification.

This invention relates to preserving processes in general, and more particularly to processes for preserving fruits, the particular object of the invention being to provide a process by which the fruit may be preserved by drying without materially lessening the weight of the fruit.

A further object of the invention is to so treat the fruit that it will be insured against decay and in which the fruit will not require sweetening when finally prepared for the table.

I am aware that in the usual process of canning fruits the fruits are boiled or stewed in a syrup; but after this step of the process the fruits are placed in jars and immersed in a syrup and are then in a condition to be used only after the manner of ordinary preserves and not after the manner of dried fruits.

The present process consists in boiling the fruit in a bath of melted sugar in viscid condition produced by the indirect application of steam heat to the sugar and then in drying the fruit to expel the moisture therefrom.

In the accompanying drawing, forming a part of this specification, there is illustrated one form of apparatus capable of carrying out the process, it being understood that other apparatus may be employed and still be within the scope of the invention, and in the drawing the figure is a view in sectional elevation, showing diagrammatically an apparatus by which sugar may be reduced to a syrupy mass by the application of indirectly-applied steam heat.

Referring to the drawing, 1 designates a boiler; 2, a kettle; 3, a water-reservoir; 4, a water-supply pipe leading from the reservoir and connecting with the boiler near the bottom thereof, and 5 a steam-exhaust pipe leading from the reservoir and connecting with the boiler near the top thereof and operating to convey steam from the boiler and discharge it into the reservoir, where it is condensed and may be reused. The pipe 4 is provided with an ordinary valve 6, by which to control the supply of water to the boiler, a pipe 7, carrying a valve 8, being connected with the reservoir to supply the same with water. The upper edge of the boiler is provided with an inturned flange 9, which bears against the side of the kettle and holds the same from contact with the sides of the boiler, thereby to permit application of steam to the entire body of the kettle. The kettle is provided with an outturned flange 10 to rest upon the flange 9 of the boiler and is closed by a suitable cover 11. The boiler is shown as resting upon a plate 12, which represents the top of a stove or other heating device.

In operating in accordance with the present process a quantity of granulated sugar is placed in the kettle and heat is then applied to the boiler, thereby generating steam therein, which operates to heat the kettle and melt the contained sugar to produce the viscid syrup described. The fruit is then cut to proper size and is peeled, or may be uncut and peeled, or may be unpeeled, according to the nature of the fruit and the conditions to be secured. The fruit is then placed in the syrup, and the syrup is boiled for twenty-five minutes or thirty minutes or approximately that long, and when the boiling operation is completed the fruit is taken from the syrup and is dried. After being thoroughly dried the fruit is ready for shipment, and in preparing for the table it is only necessary to cook in a small quantity of water to make a palatable stew. The syrup in the boiler becomes strongly impregnated with the flavor of the fruit and may be drawn off and congealed to form a fine quality of jelly. The loss of weight usually incident to the drying process is avoided, and the finished product has nearly the same weight as the raw fruit, the loss in weight of water being compensated for approximately by the gain in sugar, there being used from three to five pounds of sugar to each bushel of fruit. In treating apples or peaches by this process the boiling is maintained until the fruit becomes clear, which condition indicates that the boiling step of the process is at an end, and it is of course understood that different fruits may be given different specific treatment under the process. The term "viscid syrup" here employed has been selected as best defining the product obtained by treating sugar with indirectly-applied steam heat, as described, and it is to be understood that the above term is intended to define the said product from an ordinary syrup produced by boiling together sugar and water.

What is claimed is—

1. The herein-described process of preserving fruit, which consists in boiling the fruit in a bath of melted sugar in viscid condition produced by the indirect application of steam heat to the sugar, and then in drying the fruit to expel the moisture therefrom.

2. The herein-described process of preserving fruit, which consists in placing in a suitable holder a quantity of sugar, reducing the same to a viscid syrup through the agency of indirectly-applied steam heat, placing the fruit in the syrup and boiling it until the fruit is thoroughly saturated with the syrup, and then drying the fruit until the moisture is expelled.

In testimony that I claim the foregoing as my own I have hereto affixed my signature in the presence of two witnesses.

ALBERT P. GAINES.

Witnesses:
H. H. COOK,
A. S. THOMPSON.